July 17, 1956 W. H. LAW 2,754,616
FISHING BOB
Filed Jan. 30, 1953
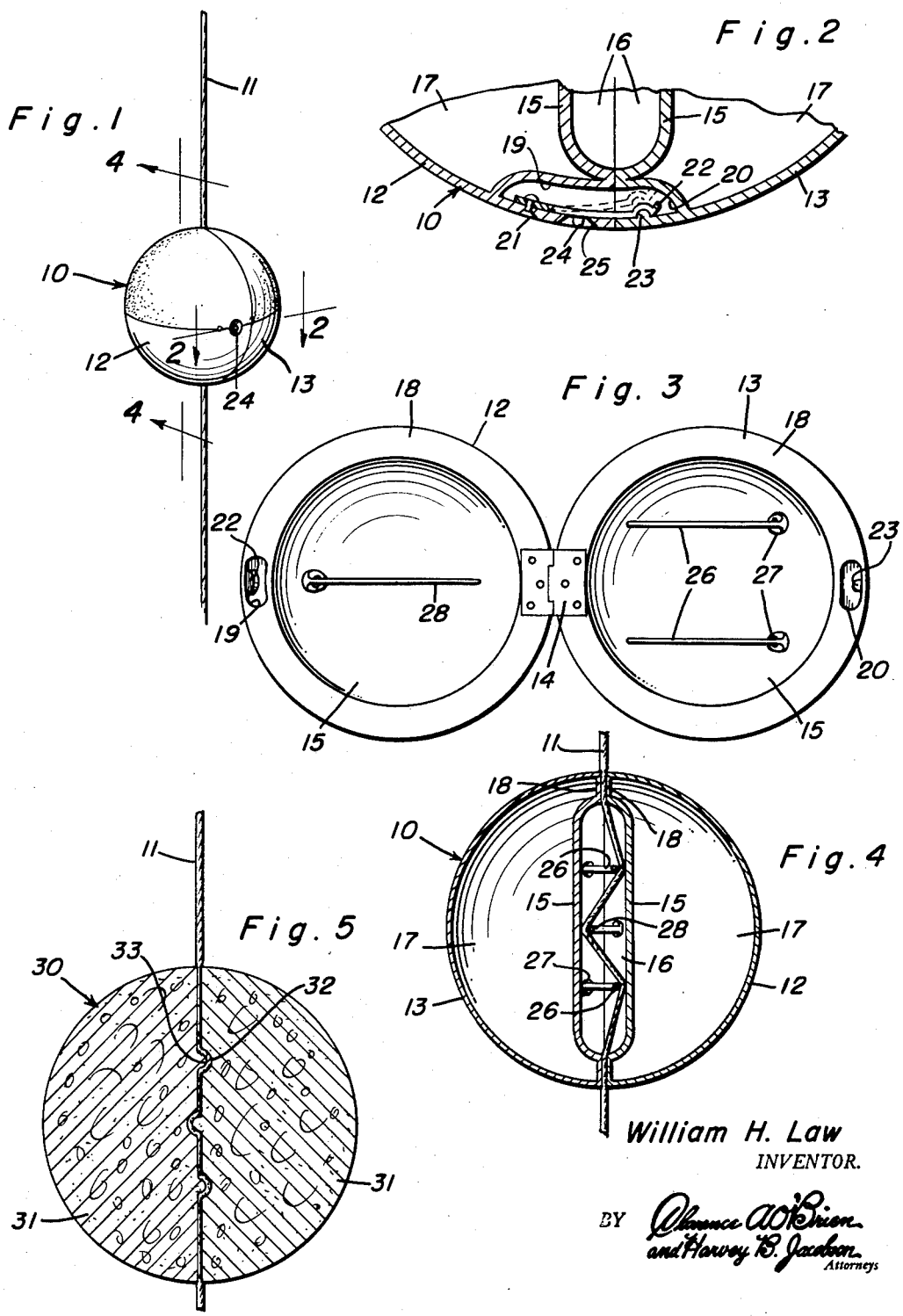
William H. Law
INVENTOR.

United States Patent Office 2,754,616
Patented July 17, 1956

2,754,616
FISHING BOB

William H. Law, Colorado Springs, Colo.

Application January 30, 1953, Serial No. 334,263

1 Claim. (Cl. 43—44.91)

The present invention relates to new and useful improvements in fishing floats or bobs and has for its primary object to provide, in a manner as hereinafter set forth, a device of this character which is adapted to be expeditiously mounted on a line or removed therefrom.

Another very important object of the invention is to provide a fishing bob of the aforementioned character which is readily adjustable on the line and which, further, embodies unique means for securing the device in adjusted position.

Other objects of the invention are to provide a fishing bob of the character described which will be comparatively simple in construction, durable, reliable in use, compact, attractive in appearance and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view, showing a fishing bob in accordance with the present invention mounted on a line.

Figure 2 is a fragmentary view in section, taken substantially on the line 2—2 of Figure 1.

Figure 3 is an elevational view, showing the device open.

Figure 4 is a vertical sectional view through the fishing bob, taken substantially on the line 4—4 of Figure 1.

Figure 5 is a vertical sectional view through a modification.

Referring now to the drawing in detail and Figure 1 thereof in particular, it will be seen that reference character 10 designates a sphere or ball of suitable material and diameter. The ball 10 is removably and adjustably mounted on a fishing line 11. Toward this end, the ball 10 includes a pair of substantially hollow, complemental half sections 12 and 13 which are hingedly connected at 14.

The half sections 12 and 13 of the ball 10 comprise opposed inner walls 15 which are shaped to define inner and outer chambers 16 and 17, respectively, in said ball. The inner walls 15 of the sections 12 and 13 include flat, annular marginal portions 18 which are brought into face abutting engagement with each other when said sections 12 and 13 are closed.

At points diametrically opposite the hinge connection 14, the sections 12 and 13 of the ball 10 have formed in the portions 18 thereof depressions or recesses 19 and 20. Secured as at 21 (see Figure 2) in the recess 19 is a resilient latch 22. The free end portion of the latch 22 is engageable with a lug or teat 23 which is provided therefor in the recess 20 for releasably securing the half sections 12 and 13 in closed position. A button or lug 24 is provided at an intermediate point on the resilient latch 22 for disengaging the same. An aperture 25 in the section 12 of the ball 10 accommodates the button 24.

Mounted in the chamber 16 on the inner wall 15 of the ball section 13 is a pair of spaced, parallel, resilient rods 26 of suitable metal. The rods 26 include apertured, flattened portions 27 at one end which are anchored to the respective wall 15.

Mounted on the inner wall 15 of the ball section 12 at a point intermediate longitudinal planes of the rods or bars 26 is a single similar rod 28. As shown to advantage in Figure 4 of the drawing, when the ball 10 is closed, the rods 26 project into the section 12 and the rod 28 projects into the section 13.

It is thought that the use of the bob will be readily apparent from a consideration of the foregoing. Briefly, the line 11 is inserted vertically between the half sections 12 and 13 of the ball 10, said line preferably being held reasonably taut. The sections 12 and 13 are then squeezed to closed position in a manner to frictionally clamp the line between the upper and lower portions of the flat peripheral or marginal portions 18 of the walls 15. The resilient latch 22 snaps over the lug 23 for securing the half sections in closed position on the line. When the half sections 12 and 13 of the ball are closed the staggered resilient rods 26 and 28 distort and tighten the line in the manner shown in Figure 4 of the drawing for further frictionally securing the bob in adjusted position against slipping on the line. Of course, to remove the bob from the line it is only necessary to disengage the latch 22 from the lug 23 through the medium of the button 24 thereby permitting the half sections 12 and 13 of the ball 10 to be swung to open position on the hinge 14. As suggested in Figure 1 of the drawing, the ball 10 may be ornamented as desired.

The modification of Figure 5 of the drawing comprises a solid ball 30 of suitable buoyant material. The ball 30 includes a pair of complemental half sections 31 which are hingedly connected and which are adapted to be clamped on the line 11. The flat, opposed inner faces of the sections 31 have formed therein complemental grooves and ribs 32 and 33, respectively, for anchoring the line 11 against slippage through the ball when said sections are closed on said line.

It is believed that the many advantages of a fishing bob constructed in accordance with the present invention will be readily understood and although preferred embodiments of the device are as illustrated and described, it is to be understood that changes in the details of construction may be resorted to which will fall within the scope of the invention as claimed.

What is claimed as new is as follows:

A fishing bob of the character described comprising: a buoyant ball including a pair of hollow hemispheres hingedly connected for receiving and frictionally clamping a line therebetween, said hemispheres having registering communicating chambers therein to be traversed by the line, said chambers having spaced, opposed walls, means releasably securing the hemispheres in closed position on the line a pair of spaced, parallel resilient rods in the respective chamber of one of said hemispheres engageable transversely with the line for frictionally engaging same with the wall of the opposed chamber, and a resilient rod in the respective chamber of the other of said hemispheres engageable transversely with the line at a point intermediate the first-named rods for frictionally engaging said line with the chamber wall of said one hemisphere.

References Cited in the file of this patent

UNITED STATES PATENTS

| 718,081 | Brackett | Jan. 13, 1903 |
| 880,090 | McMahon | Feb. 25, 1908 |
| 1,176,631 | Wells | Mar. 21, 1916 |
| 1,240,043 | Gregory et al. | Sept. 11, 1917 |
| 1,413,690 | Slocum | Apr. 25, 1922 |
| 1,579,360 | Hartwig | Apr. 6, 1926 |

FOREIGN PATENTS

| 250,514 | Great Britain | Apr. 14, 1926 |